UNITED STATES PATENT OFFICE 1,923,918

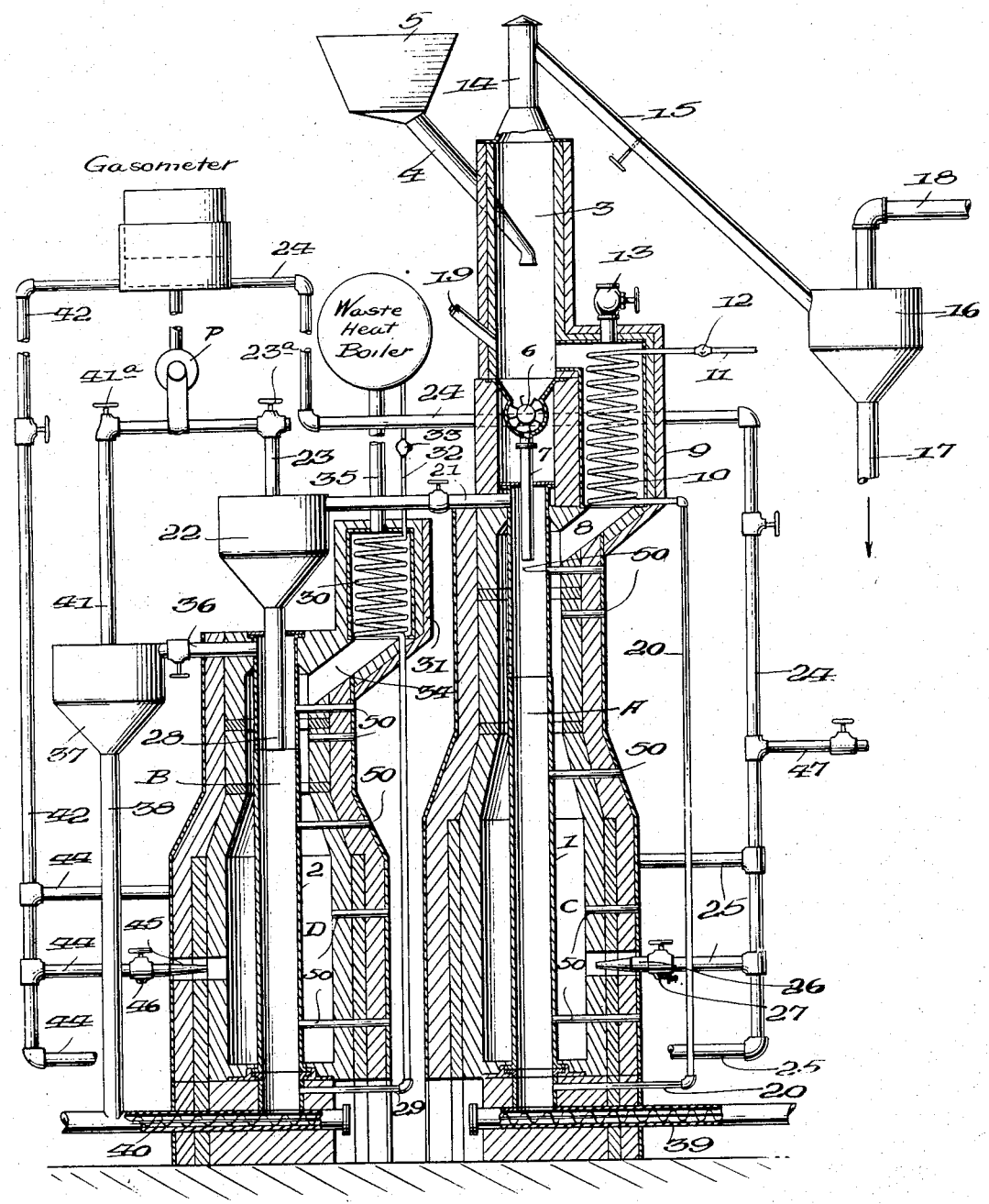

PROCESS OF AND APPARATUS FOR MAKING ACTIVATED CARBON

Raymond G. Davis and Marshall T. Sanders, Wilmington, Del., assignors to Darco Corporation, Wilmington, Del., a Corporation of Delaware Application April 5, 1930. Serial No. 441,930

15 Claims. (Cl. 252—3)

This invention relates to processes of and apparatus for making activated carbon; and it comprises a process of activation of carbon particularly adapted, but not restricted, to the treatment of lignite as a raw material, wherein the activation of the carbon may supply the fuel needed for activation, ground lignite, advantageously containing less than 16 per cent ash on a dry basis, being dropped through a preheater into a current of steam ascending through a hot walled tube, the velocity of the steam and of the gases formed thereby and therefrom through the tube being such as to carry fine material forward and away while coarser material drops in a retarded countercurrent fall through the steam ascending in said tube, the size of tube, the temperature of the tube walls, the feed of material thereto and the flow of steam therethrough being so correlated that the falling particles in the period of fall afforded shall lose an amount of carbon so related to the contained ash that the ratio of the ash content in the product to that of the raw material on a dry basis shall be not less than 2 to 1 and not more than 5 to 1, such conditions being further so correlated that no substantial amount of $CO_2$ shall be produced in the action of the steam on the carbon, heat for activation being obtained by burning the gas formed in activation; and it also comprises a pair of vertical activating chambers adapted to be externally heated by combustion of the gas formed in activation, one of the chambers having its gas outlet running through a dust collector adapted to deliver collected dust to the other chamber, means of feeding raw material in small particles of non-uniform size through a preheater and thence through a regulated feeding device to the first chamber, controlled means for introducing superheated steam to both chambers, superheaters for the steam adapted to cool the combustion gases from the external heating of the several chambers and controlled means for passing part of said cooled gases to the preheater; all as more fully hereinafter set forth and as claimed.

Decolorizing carbon and other forms of activated carbon are always made by heating carbon of some kind in the presence of steam or products of combustion. Some of the carbon is consumed and the residue is "activated." Any carbonaceous material may be employed and many are in use; among them lignite. The action of the gases on the carbon is strongly endothermic and a considerable quantity of heat must be supplied at a high temperature plane. This introduces difficulties both as to process and as to apparatus. For the activation by partial oxidation of carbonaceous material various means and methods have been proposed. These are all more or less deficient in yield of activated products, in control of the degree and uniformity of activation, as to effective utilization of activating agents and fuel and as to productive capacity of plant apparatus. Prior methods have failed to make provision for adequate mixing of material and activating agent so as to insure contact of reagents with temperature control and correlated heat supply for the endothermic reactions involved. Definite proportioning of reagents has been lacking. Control of flow of reagents in relation to size of reaction chambers has not been provided.

It is an object of the present invention to provide a process and an apparatus capable of being used on a large scale with a maximum output per day with a minimum of wastage of the carbon and with the delivery of a standardized product of high and uniform recolorizing capacity.

The present invention in some of its aspects is an improvement upon the invention of our co-pending application Serial No. 306,375 filed Sept. 17, 1928, (Patent No. 1,810,871).

While the art regards $CO_2$ and $H_2O$, or products of combustion and steam, as equivalents in making decolorizing carbon, we have found, as stated in said copending application, that this is not so; that the action of steam is better than that of $CO_2$ and that it is better to effect activation in the absence of $CO_2$ as far as possible. By a proper regulation of conditions it is possible to limit the action of steam in activation to the production of CO and $H_2$ without much secondary production of $CO_2$ by the action of CO on the $H_2O$. In so doing, we produce as a by-product of our process "blue gas" or water gas of unusually high calorific value. This is advantageously used as a source of heat in the operation but it may be used for chemical purposes, as in the production of hydrogen. By careful proportioning of the steam and carbon, and with temperature control, we may set a maximum of 11 per cent of $CO_2$ in the effluent gases (on a dry basis) as a maximum which should not be exceeded. In the best operation, we keep the $CO_2$ content at 3 per cent or less.

While our operation as hereinafter described may be applied to other carbonaceous material we shall hereinafter speak more specifically of lignite as it has proved in practice an excellent raw material for large scale production. For one thing, it obviates any troublesome pre-preparation such as is necessary in using most of the high volatile bituminous and coking coals or vegetable materials like wood, nut-shells, sawdust, straw, etc.; materials requiring a careful preliminary carbonization. The lignite merely requires drying and slight carbonization to prepare it for activation. Lignite always contains moisture and ash. We have found that for the best practice a lignite should not contain more than 16 or 17 per cent ash on a dry basis and a somewhat less ash content is desirable. A lignite containing about 12 per cent ash (on a dry basis) we regard as a desirable grade.

In activating carbon there is a limit to the amount of carbon to be removed by gasification, because of the effect upon the product, because of the wastage of material and because of the amount of heat required. However, for a highly efficient product there must be a considerable gasification of carbon. In the case of a lignite containing 12 per cent ash, we find that the best results as regards output and decolorizing efficiency are secured by making an activated product with about 40 per cent ash. With lignites of other ash contents a similar relation obtains. In general, the ratio of the ash content of the activated product to that of the raw lignite (on a dry basis) should be at least 2 to 1 and not greater than 5 to 1. This ratio is an approximate measure of the consumption of carbon in the activating process.

We find that the best results are obtained by dropping the ground lignite (or other carbonaceous material) downward in a retarded countercurrent fall through an ascending current of steam in a hot walled tube; the heat of the walls being sufficient to bring the reagents up to an activating temperature between 920° and 1020° C. and to supply the necessary heat available at these temperatures. In dropping a material through a tube the amount of action which can be secured depends not only upon the size of the tube but on the velocity of the upward passage of steam, the temperature of the heat radiating walls and several other factors. With a tube of fixed size and at a fixed temperature and with a fixed rate of steam flow, the action varies considerably according to the size of the particles. In what we now regard as the best embodiment of our invention we grind the lignite to small particles of non-uniform size and regulate conditions so that the fine particles dropped into the tube or formed by the carbon consuming actions in the tube shall be blown out with effluent gas. The blown-over material, which is in part activated, is collected and re-treated in another operation under conditions appropriate to the smaller size of granule.

While in activation we desire the absence of any substantial amount of $CO_2$, its contact with material at lower temperatures in drying, carbonizing and preheating is immaterial provided the temperature of the solid material does not reach an activating temperature, say 700° C. And it is a matter of advantage to utilize for this purpose low temperature heat in the gases of combustion primarily employed in heating the activating tube. In practice we take the fire gases coming from around the activating tube and pass them first in contact with steam superheating coils, thereby not only obtaining superheating of steam to be introduced to the activating zone but also dropping the temperature of the products of combustion to a point where it is safe to contact them with material to be dehydrated, partially carbonized and preheated. In this embodiment of our invention, the ground raw material is dropped and dispersed through an upward current of these somewhat cooled products of combustion and passes thence to the activating zone proper where it is brought into contact with steam only and under conditions such that the formation or persistence of $CO_2$ is kept at a minimum.

In this invention the activation of the carbonaceous material may be made to produce sufficient gas to supply all the fuel needed for the activation. For example, we may start with raw, air-dried lignite (12 to 15 per cent ash) and grind it to non-uniform particles smaller than 0.05 inch, that is, so that all, or substantially all passes a 20-mesh screen. We first preheat it as above described and feed it distributively into the top of a vertical tubular chamber where the particles fall in countercurrent contact with an ascending flow of superheated steam which is introduced near the bottom. From near the top of the chamber the gases formed in activation are led to a gasometer and thence to a combustion zone surrounding the chamber. Thus the chamber is externally heated to about 1200° C. by combustion of the chamber gas, preferably as a neutral flame without substantial excess of air (the operation having been started with other fuel). Leaving the combustion zone surrounding the chamber at a high temperature, the products of combustion are passed over a steam coil for superheating contained steam, and are thereby cooled to about 700° C. by transfer of heat to steam. Instead of the coil, regenerators or recuperators of well known design can be used for superheating the steam. The partially cooled combustion products, or a part of them, are then passed through the preheater where they contact with the particles of lignite in countercurrent, heating the lignite and carrying fine dust away. The upward flow of steam in the activating chamber is carefully controlled with relation to the cross-sectional area of the tubular chamber, that is, the amount of steam introduced per unit of time bears a definite relation to this area and the feed of lignite to the chamber is also definitely related to this area. We have obtained excellent results in tubes of 20 inches diameter and 20 feet high with a steam flow, superheated to 700° C., of 30 to 40 pounds per hour per square foot of cross-sectional tube area, and with an output of 15 to 25 pounds activated product (30 to 40 per cent ash) per square foot per hour. With a 20-mesh lignite the amount of steam used should be less than 4 pounds and usually less than 2 pounds per pound of furnace product. With more finely powdered material about 1 pound steam per pound of product is used, and the rate of steam flow is less per square foot of chamber area than with the coarser material. In this manner the amount of steam is proportioned to the input of lignite; and the relative proportions of steam and lignite and the design of the apparatus are such that steam is decomposed and gas formed in the chamber at a rate sufficient to produce all the fuel gas needed to maintain the activation zone at the required temperature, say, between 920° and 1020° C.; the products of the combustion of this gas also supplying the superheat for the steam and the preheat from the lignite. Fine dust from the lignite is carried out of the preheater by the combustion gases and is collected and advantageously used for boiler fuel in the generation of the steam. In adjusting the flow of steam through the chamber, a correlation between the upward velocity of gas and the fineness of the lignite is maintained. The coarser the lignite the greater the flow of steam may be. In order to maintain a high rate of through-put and production, it is advantageous to maintain a relatively high velocity of steam and formed gases, to blow partially activated finer particles of lignite out of the top of the chamber with the gas, to collect this finer material in a dust separator and to complete the activation of the fines by steam in a second chamber similar to the first but with a lower relative velocity of steam flow. As an alternative however the fines can of course be accumulated and run through the first chamber in a separate operation using a lower steam velocity.

In the accompanying drawing we have shown, more or less diagrammatically, apparatus within the invention and adapted for use in the described process.

In this showing, the view is in central vertical section with certain parts in elevation.

As shown, A and B represent two activating zones inside the tubes 1 and 2, which may be made of heat-resistant alloy. Surrounding the tubes are annular combustion zones C and D formed and defined by casings of suitable refractories. Above activating zone A is heat insulated preheater 3. This is adapted to be fed through pipe 4 from hopper 5 with ground lignite which drops in dispersed particles into the bottom of the preheater where it collects and is controllably fed by means of star-valve 6, through pipe 7, into the top of tube 1. From the top of combustion zone C leads conduit 8 into superheater 9 in which is steam coil 10 supplied through pipe 11 provided with valve 12. Pipe 11 leads from a steam boiler (not shown). The top of the superheater is connected with the bottom of the preheater and a valved pipe 13 in the superheater is provided in order to lead away combustion products not needed in the preheater. Pipe 13 may very well lead to a waste heat boiler. At the top of the preheater is dome 14 from which combustion products and dust are conducted by pipe 15 which has a damper to maintain a superatmospheric pressure in 3. Pipe 15 leads to dust collector 16, from which collected dust is removed through pipe 17 while waste gases pass through pipe 18. Near the bottom of the preheater 3 is plugged pipe 19 through which samples of the preheated material may be taken. From the superheater coil 10, pipe 20 leads into the bottom of tube 1, preferably tangentially of the tube.

From the top of activating zone A the gases formed in activation and the finer material coming in through pipe 7 and carried out by the activation gases, are led through the dampered pipe 21 into dust collector 22, in which the gases are separated from the solids and leave the dust collector through pipe 23, leading to pressure blower P, which pumps the gases into a gasometer. Valve 23a aids in maintaining superatmospheric pressure in dust collector 22. From the gasometer, pipe 24 carries the gases to the combustion zone C, into which the activation gases are delivered tangentially through branches 25 at different levels and at different points in the circumference of the combustion zone. Each branch 25 has a burner 26 provided with an air damper 27, by means of which the relative proportions of air and gas are regulated. From the dust collector 22 the pipe 28 delivers fine particles of partially activated material, carried by the gases from zone A, into zone B in tube 2, to be further activated by steam introduced tangentially into tube 2 through the pipe 29. Steam is supplied to pipe 29 after being superheated in coil 30 of superheater 31. To the superheater coil steam is run through pipe 32 with valve 33, running from a source of steam. The superheater is heated by products of combustion from combustion zone D, carried in conduit 34, and leaving the superheater through pipe 35 which, advantageously, may carry the products of combustion from the superheater to a waste heat boiler. Such boiler may serve as a source of steam from which pipes 11 and 32 run.

From the top of activating zone B dampered pipe 36 leads the gases formed in activation and fine activated powder carried thereby to dust separator 37. From this the fine powder is removed through pipe 38. From the bottom of the activating chambers A and B the activated material is brought by means of screw conveyors 39 and 40 respectively, to cooling and storage means (not shown). The fine material carried in pipe 38 may or may not be added to the activated material delivered by conveyor 40. From the top of dust separator 37 pipe 41, having valve 41a, carries the gases from activating zone B to pressure blower P, which pumps these gases into a gasometer. From here the gases are led through connected pipe 42 and branches 44 to the burners for combustion zone D, these burners being designated 45 with valved air inlet 46. Valved pipe 47 serves to introduce other fuel into the heating system. Pyrometer tubes, designated 50, are provided at the top, middle and bottom of the activating zones and in the combustion zone for purposes of permitting close temperature control.

In the operation of the above described apparatus, after the tube 1 has been heated to the activating temperature, which may be by any suitable fuel, the raw material, dried no more than is necessary for its grinding, and ground, for example, to all pass a Standard U. S. 20 mesh screen, is fed distributively into the preheater which is so designed that the flow of gases therethrough in amounts required for preheating the material will maintain an even distribution of suspended material and will carry out of the top only the finest particles. The remainder of the ground material falls to the bottom of the preheater where it collects and is controllably discharged through the device 6 into the top of activating zone A. At the same time steam is admitted near the bottom of tube 1 at a velocity such that particles of, say, 60 mesh size or larger fall through while materials of smaller size are blown out with the activation gases and are collected in a suitable collector 22.

In this case the −20 mesh, +60 mesh particles are activated in zone A and removed by conveyor 39; the −60 mesh particles, carbonized and partially activated, being blown forward to be activated in zone B.

Into the second activating zone or tube 2 steam is admitted at a rate such that say, +150 mesh particles in the material delivered by pipe 28 will drop through, be activated and then discharged by conveyor 40, while the −150 mesh particles will be blown out of tube 2 to be collected in separator 37. Pipe 28 may be made to deliver part way down in tube 2 and the −150 mesh particles delivered by pipe 38 will then be an activated product.

The apparatus can be designed for the capacity desired with any degree of fineness and proportionate rates of steam flow.

With lignite or soft coal as raw material the apparatus can be so operated that the volatile matter is largely driven off in the preheater. Usually, only a part of the combustion gases leaving superheater 9 is put through preheater 3.

The activated product produced as above described is subjected, before use, to usual finishing treatments, such as acid washing and the like.

Among the advantages of the process and apparatus are close control, relatively large yields of high activity, uniformity of product and good fuel economy.

What we claim is:—

1. In activating finely ground carbonaceous materials by dropping the same in a retarded counter current fall through a heated ascending current of activating gas, a process which comprises so adjusting the feed of material and the upward velocity of gas flow that the coarser particles of the ground material shall fall through and be activated by the gas while finer and less activated particles are blown forward and away with the gases formed in activation of the coarser particles and subsequently subjecting the finer particles to further activation.

2. The process of making activated carbon which comprises dropping particles of preheated ground carbonaceous raw material in a retarded counter current fall through an ascending current of superheated steam and gases formed thereby in a chamber externally heated by combustion of the gases formed by said steam, partially cooling the products of said combustion in superheating said steam and preheating said raw material by contacting it with said partially cooled combustion products.

3. The process of activating carbonaceous material which comprises partially oxidizing such material by heating it with steam to produce combustible gas, supplying the heat absorbed in said oxidation by burning said gas with air and first superheating said steam by transfer thereto of heat from the products of said burning, and then the combustion products being at a lower temperature, preheating the carbonaceous material by transfer thereto of heat from the combustion products.

4. In activating finely ground carbonaceous materials by dropping the same in a retarded counter current fall through a heated ascending current of activating gases, a process which comprises adjusting conditions so that the coarsest particles of the ground materials shall be thoroughly activated in the time afforded for fall through said current, the speed of flow of ascending gases at and near the point of introduction of material to gas being sufficient to carry forward finer particles with the out-going gas, and collecting the fine, blown out, incompletely activated material for subsequent activation.

5. In activating ground carbonaceous materials by dropping the same in a retarded counter current fall through a heated ascending current of activating gases, a process which comprises adjusting conditions so that the coarsest particles of the ground materials shall be thoroughly activated in the time afforded for fall through said current, the speed of flow of ascending gases at and near the point of introduction of material to gas being sufficient to carry forward finer particles with the outgoing gas, collecting the fine blown out, incompletely activated material and separately activating the collected blown out material in another and slower current of activating gas.

6. In producing activated carbon from ground lignite containing ash, the process which comprises dropping such ground material in a retarded countercurrent fall through an ascending current of steam in a hot-walled tube, the size of tube, the feed of material, the flow of steam and the temperature of the walls being so correlated that during its time of fall as determined by said conditions the material shall lose such an amount of carbon that the percentage of ash in the activated product shall be not less than two nor more than five times the percentage of ash in the raw lignite on a dry basis.

7. A process of activating carbon which comprises dropping the raw material to be activated, ground to pass a 20-mesh screen, in a retarded countercurrent fall through an ascending column of heated steam, the proportion of steam to product being about 2:1 by weight.

8. A process of activating carbon which comprises dropping the raw material to be activated, ground to pass a 20-mesh screen, in a retarded countercurrent fall through an ascending column of heated steam, the proportion of steam to product being less than 4:1 by weight.

9. A process of activating carbon which comprises dropping the raw material to be activated, ground to pass a 20-mesh screen, in a retarded countercurrent fall through an ascending column of heated steam, the proportion of steam to product being less than 4:1 by weight and the temperature of the activating zone being maintained above 920° C.

10. The process of producing an activated carbon which comprises introducing ground lignite into the upper part of a heated activating zone through which passes an upward current of steam and gaseous reaction products at such a velocity as to carry out of the activating zone a portion of the raw material, separating this material from the gas and introducing it into the upper portion of a second similar activating zone through which passes an upward current of steam and gaseous reaction products at a velocity substantially less than that in the first activating zone and collecting the products which drop through the two activating zones.

11. Apparatus for activating carbonaceous materials comprising a vertical tubular chamber, regulated means for feeding ground material into the top thereof, regulated means for introducing activating gas into the bottom thereof, means for removing activated product from the bottom, gas outlet means near the top, a combustion chamber surrounding said tube and means for conveying gases from said gas outlet means to said combustion chamber, said feeding means including means for separating finely powdered solid material from the gases passing from said chamber.

12. Apparatus for activating carbonaceous materials comprising a pair of vertical tubular activating chambers with means for introducing ground material near the tops of said chambers, means for introducing gas near the bottoms of said chambers, gas outlets near the tops of said chambers, a dust collector connected to the gas outlet means of the first chamber, a conduit adapted to deliver collected dust from said dust collector to the means for introducing ground material to the second chamber, and means for removing activated product from the bottoms of both chambers.

13. Apparatus for improving fuel economy in the activation of carbonaceous materials by steam, comprising an activating chamber, a combustion chamber surrounding the activating chamber, a raw material preheater above the activating chamber and adapted to deliver ground material thereto, a steam line with a superheater connected to the bottom of the activating chamber and adapted to be heated by gases leaving the combustion chamber and a gas conduit connecting the superheater to the preheater.

14. In making activated carbon, a process which comprises dropping dispersed particles of the raw material through an upwardly moving current of products of combustion, stopping said fall, then feeding positively in regulated flow the preheated material in a retarded countercurrent fall through an ascending column of heated steam adjusted at a rate of flow such that the coarser particles of the material fall through and are activated by the steam while finer and partially activated particles are carried away in the gases formed in activation.

15. Apparatus for activating finely divided carbon comprising in combination an externally heated activating chamber, a preheating chamber above the activating chamber and having means for passing upwardly therethrough combustion gases from said external heating, means for introducing ground materials to the preheating chamber to pass downwardly therethrough, means intermediate the two chambers for collecting the preheated ground material passing from the preheating chamber and for feeding it at a regulated rate into the top of the activating chamber, separate gas outlet means near the top of the activating chamber and means at the bottom for removing the activated product.

RAYMOND G. DAVIS.
MARSHALL T. SANDERS.